United States Patent
Güldenpfennig

[15] 3,674,731
[45] *July 4, 1972

[54] METHOD FOR PRODUCING WATER-DILUTABLE EPOXY ESTER RESINS CONTAINING COPOLYMERS OF VINYL AND/OR VINYLIDENE COMPOUNDS

[72] Inventor: Rolf Güldenpfennig, Dossenheim, Germany

[73] Assignee: Reichhold-Albert-Chemie Aktiengesellschaft, Hamburg, Postfach, Germany

[ * ] Notice: The portion of the term of this patent subsequent to Feb. 16, 1988, has been disclaimed.

[22] Filed: Oct. 26, 1970

[21] Appl. No.: 84,112

Related U.S. Application Data

[63] Continuation-in-part of Ser. No. 673,997, Oct. 9, 1967.

[30] Foreign Application Priority Data

Nov. 2, 1966 Germany ..............................4450239

[52] U.S. Cl.......................260/23 EP, 204/181, 260/23 CP, 260/23 ST, 260/23 AR, 260/23 S, 260/29.6 R
[51] Int. Cl..........................................................C08g 45/00
[58] Field of Search ..............................260/23 EP; 204/181

[56] References Cited

UNITED STATES PATENTS 3,563,929  2/1971  Güldenpfennig ........................260/23

Primary Examiner—Donald E. Czaja
Assistant Examiner—Donald J. Barrack
Attorney—Krafft & Wells

[57] ABSTRACT

The invention relates to a process for the production of improved water-dilutable epoxy resin esters which are prepared as follows:

a. partial esters with hydroxyl groups and epoxy groups are first formed by partial esterification of compounds containing epoxy or hydroxyl groups with mixtures of monocarboxylic acids consisting mainly of unsaturated aliphatic straight chain monocarboxylic acids;

b. the resulting partial esters are then reacted with polybasic carboxylic acids in such a manner that the epoxy resin esters with free carboxyl and free hydroxyl groups are rendered water-dilutable by neutralization with aqueous ammonia or strong organic nitrogen bases;

c. epoxy resin esters are then reacted with aqueous ammonia and/or strong organic nitrogen bases in the presence of water, until they are converted into sufficiently water-dilutable synthetic resins, the improvement comprising:
  1. the epoxy resin esters in step (a) and/or
  2. in step (b), and/or
  3. the unsaturated aliphatic monocarboxylic acids added in step (a), and/or
  4. adducts of αβ-unsaturated dicarboxylic acids on unsaturated monocarboxylic acids, preferably added in step (b), and/or
  5. the monocarboxylic acids that are used for the production of these adducts, are copolymerized with at least one polymerizable vinyl and/or vinylidene compound by heating in the presence of polymerization catalysts.

1 Claim, No Drawings

METHOD FOR PRODUCING WATER-DILUTABLE EPOXY ESTER RESINS CONTAINING COPOLYMERS OF VINYL AND/OR VINYLIDENE COMPOUNDS

CROSS-REFERENCES TO RELATED APPLICATIONS

This application is a continuation-in-part of applicant's copending application Ser. No. 673,997, filed Oct. 9, 1967.

Applicant incorporates by reference his copending U.S. application Ser. No. 41,684 filed May 25, 1970, entitled "-Method for Producing Water-Dilutable Coating Compositions Containing Water-Dilutable Synthetic Resins," which is a continuation of his application Ser. No. 532,867 filed Mar. 7, 1966, entitled "Method for Producing Water-Dilutable Coating Compositions Containing Water-Dilutable Synthetic Resins."

BACKGROUND OF THE INVENTION

The field of the invention is methods for preparing coating compositions containing fat, fatty oil, fatty oil acid or salts thereof.

Application Ser. No. 41,684 discloses a method of producing water-dilutable coating compositions containing water-dilutable synthetic resins consisting of partial esters produced by the esterification of monocarboxylic acids with compounds containing epoxy groups and hydroxyl groups formed by hydrolytic dissociation of the epoxy groups, said partial esters being esterified with polybasic carboxylic acids and neutralized with strong nitrogenous bases in the presence of water to render them water-dilutable, and by being mixed afterwards with sufficient amounts of strong nitrogenous bases in the presence of water to convert said resins into sufficiently water-dilutable synthetic resins characterized in that adducts of $\alpha,\beta$-ethylenically unsaturated dicarboxylic acids including anhydrides of $\alpha,\beta$-ethylenically unsaturated dicarboxylic acids to fatty acids of drying or semi-drying oils are applied as polybasic acids without anhydride groups.

In French Pat. No. 1,388,543 a process is described for the preparation of new condensation products from polyglycidyl ethers of a diphenol with one or more mono-basic fatty acids or one or more polybasic fatty acids, at least one of whose carboxyl groups lies at a polymethylene group having at least four carbon atoms, or with an anhydride of such an acid, where the amounts of the monobasic and polybasic acids, expressed as equivalent weights, do not exceed that of the polyglycidyl ether.

Austrian Pat. No. 244,910 discloses a process for coating an anode in an electric circuit which makes use of an aqueous bath in electrical contact with an anode and a cathode and where:

a. the bath has dispersed in it a coating composition containing a polycarboxylic acid resin which is at least partly neutralized by a water-soluble amino compound, the resin having an electrochemical equivalent weight of 1,000 to 20,000 and an acid number of 30 to 300, and in this bath the behavior is that of an anionic polyelectrolyte which is deposited on the anode in about direct proportion to the electric current flowing through the bath, b. a direct current flows through this bath and through the deposited film under a potential difference of 50 to 500 volts to be conducted away by the anode, c. the coated anode is then removed from the bath, and d. the deposited film then hardens.

The polycarboxylic acid resin of the Austrian patent can have coupled with it a drying glyceride oil which has been reacted with 2 to 25% of a polymerizable monomer and diluted with a smaller amount of a heat-stable phenol-aldehyde resin.

It has been found, however, that epoxy resin esters, especially if they are formed from low molecular weight epoxy resins, namely of molecular weights below about 750, preferably those which are obtained by alkaline condensation of 2,2-bis-(4-hydroxyphenyl)-propane with epichlorohydrin or dichlorohydrin, as is necessary for their use as water-soluble binding agents for the production of electrophoretically depositable coating compositions that are to be baked, do not possess after being baked the required hardness or the salt spray resistance that is required by the ASTM test B 117–61.

DESCRIPTION OF THE INVENTION

Having in mind the limitations of the prior art it is an object of the present invention to provide water-dilutable epoxy ester resin coating compositions having improved hardness and resistance to salt spray.

Another object of the invention is to provide water-dilutable epoxy ester resin coating compositions containing copolymers of vinyl and/or vinylidene compounds with monocarboxylic acids.

Upon further study of the specification and claims other objects and advantages of the present invention will become apparent.

In a preferred embodiment of the present invention, an effort is made by choosing the kinds and amounts of reaction partners as well as by the selection of temperatures and durations of heating, and possibly also by choice of sequence of reaction steps, to produce vinyl modified epoxy resins which contain free carboxyl groups having acid numbers between 35 and 300, preferably between 50 and 120, and free hydroxyl groups. An effort is preferably made to keep the ratio of the number of free hydroxyl groups in the vinyl modified epoxy resin to the number of carboxyl groups in the range of 0.1:1 to 2:1, and especially in the range of 0.3:1 to 1:3:1. The different practical forms of this process are described hereinafter.

For clarification, it should be stated that the vinyl modified epoxy resin esters of this invention either do not contain any more epoxy groups or only very few of them. The epoxy group content of vinyl modified epoxy resin esters must be so small that the aqueous solutions which have been neutralized with ammonia or amines will not jellify during storage.

It was found unexpectedly that the method of preparation of the water-dilutable synthetic resins has to be adapted not only to the conditions under which the applied film is dried, for example, whether the synthetic resin of this invention is dried in the open air or is baked at a higher temperature, but also to the method by which the coating is applied. Synthetic resins which produce good coatings if applied by spraying, pouring, immersion, flooding, painting or by roller application, will not in all cases produce equally good results if applied electrophoretically. Appropriate distinctions are therefore made in the specification.

The following generalizations can be made — synthetic resins that are used for producing electrophoretically separable heat-hardenable coatings are EC binders; synthetic resins for producing heat-hardenable coatings that are not electrophoretically separable are E-binders; synthetic resins for air drying coatings that are electrophoretically separable coating materials are L-binders.

The synthetic resins of this invention are especially suitable for use as electrophoretically separable coating compositions if the aqueous electrophoresis bath has a solids content of 5 to 30 percent by weight.

By water-dilutable synthetic resins are understood those substances which either alone, or at least with the addition of a minor amount of an organic solvent that is completely or highly miscible with water, e.g., mono- or diether of ethylene glycol, diethylene glycol with lower monovalent alcohols such as methanol, ethanol, propanol, butanol, for example, methyl glycol, ethyl glycol, propyl glycol, isopropyl glycol, butyl glycol, diethylene glycol diethyl-ether, also diacetone glycol, lower ketones such as acetone, methyl-ethyl ketone, are soluble or dispersible in water. Preference is given to colloidal solutions produced by mixing with water with a possible addition of water-miscible solvents.

As compounds containing epoxy groups and possibly hydroxyl groups C, the following are suitable: epoxidized olefins, diolefins and oligo-olefins such as 1,2,5,6-dioxy-hexane and 1,2,4,5-diepoxyhexane, epoxidized olefinic or diolefinic unsaturated carboxylic acid esters with mono- or polyvalent alcohols as for example mono- or diepoxy-stearic acid esters of methanol, ethanol, propanol including its isomers, butanol including its isomers, bis-(mono- and diepoxystearic acid-esters of polyvalent alcohols such as ethylene glycol, 1,2- or 1,3-propylene glycol, 1,2-, 2,3-, 1,4-butylene glycol, neopentyl glycol, 1,6-hexanediol, glycerol, trimethylolpropane, trimethylol ethane, pentaerythrite, tri-(mono- or diepoxy-stearic acid)-ester of glycerol, trimethylol-propane, trimethylol ethane or pentaerythrite, or tetra-(mono- or diepoxystearic acid)-ester of pentaerythrite. Consideration can also be given to epoxidized unsaturated oils, as for example, soybean oil, safflower oil, dehydrated castor oil, alone or in mixtures; epoxidized compounds with several cyclohexenyl groups such as diethyleneglycol-bis-(3,4-epoxy-cyclohexane carboxylate), 3,4-epoxycyclohexyl-methyl-3,4-epoxy-cyclohexane carboxylate and vinyl cyclohexene-dioxide.

Especially suitable are polyesters with epoxy groups, such polyesters being obtainable by reacting a dicarboxylic acid with epihalohydrin or dihalohydrin, e.g., epichlorohydrin, dichlorohydrin or the like in the presence of alkali. Such polyesters can be derived from aliphatic dicarboxylic acids such as oxalic acid, succinic acid, glutaric acid, adipic acid, pimelic acid, suberic acid, azelaic acid or sebacic acid, or from aromatic dicarboxylic acids such as phthalic acid, isophthalic acid, terephthalic acid, 2,6-naphthalene-dicarboxylic acid, diphenyl-o,o'-dicarboxylic acid and ethylene-glycol-bis-(p-carboxyl-phenyl)-ether, which can be used either individually or as mixtures thereof. They correspond substantially to the formula:

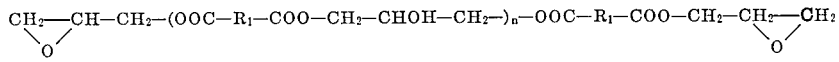

in which $R_1$ is an aliphatic or aromatic carbon containing group and n-o or a small number. Suitable compounds under this formula are those whose molecular weight is not above 3,000, and preferably those with molecular weight between 300 and 750.

Most suitable for this purpose are polyethers with epoxy groups, obtained by etherification of a divalent alcohol or diphenol with epihalohydrins or dihalohydrins, e.g. with epichlorohydrin or dichlorohydrin in the presence of alkali. These compounds can be derived from glycols such as ethylene glycol, diethylene glycol, triethylene glycol, propylene-1,2-glycol, propylene-1,3-glycol, butylene-1,4-glycol, pentane-1,5-diol, hexane-1,6-diol, and especially from diphenol such as resorcinol, pyrocatechol, hydroquinone, 1,4-dihydroxynaphthaline, bis-(4-hydroxyphenol)-methane, bis-(4-hydroxyphenyl)-methyl-phenylmethane, bis-(4-hydroxyphenyl)-tolyl-methane, 4,4'-dihydroxy-diphenyl and 2,2-bis-(4-hydroxyphenyl)-propane.

The epoxy group containing polyethers are constituted according to the following formula:

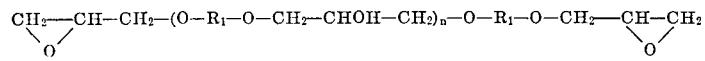

Such polyethers are derived from 2,2-bis-(4-hydroxyphenyl)-propane as the starting substance, and preferably those with a molecular weight between about 380 and 3,500.

For electrophoretically separable coating compositions such polyethers with a molecular weight from 380 to about 750 are preferable. Those with higher molecular weights are also suitable because of their ability to produce corrosion-resistant coatings, but it is more difficult with the latter to obtain high strength coatings. For water-dilutable coating compositions which can be applied by the usual coating methods such as immersion, spraying, flooding, pouring or painting, polyethers of higher molecular weights can be used.

Moreover, polyethers (including those with two or more glycidYl groups) which have three or more hydroxyl groups can also be used. They include trimethylol-propanetriglycidyl-ether, trimethylol-ethane-triglycidyl-ether, glycerol-triglycidyl-ether, pentaerythrite-triglycidyl-ether or pentaerythrite-tetraglycidyl-ether, or polyglycidyl-ethers from esters of polyvalent alcohols with hydroxyl acids, e.g., di- or triglycidyl ether of triricinoleate or castor oil.

Of the polyglycidyl-ethers, those are well suitable which are obtained in a known manner (German printed specification Pat. No. 1,184,496 and German Pat. No. 1,138,542) by reaction of novolacs of the phenol, cresol, xylenol or bisphenol basis with epichlorohydrin. Other epoxides and/or epoxy resins with epoxide groups alone or with hydroxyl groups and with molecular weights up to about 3,000 are described in large numbers in the book of A. M. Paquin "Epoxidverbindungen und Epoxidharze," published by Springer Verlag, 1958, Berlin, Göttingen/Heidelberg.

It should be mentioned that the above-named compounds can usually also be added at a time when the epoxy groups have already been partly or wholly decomposed hydrolytically, namely converted into di- or polyhydroxyl compounds.

Suitable monocarboxylic acid mixtures are those which consist mainly, or at least up to 60 percent by weight, of aliphatic unsaturated straight chain monocarboxylic acids.

Suitable monobasic aliphatic carboxylic acids A are the straight chain unsaturated fatty acids with 10 to 40 carbon atoms such as palmitoleic acid, petroselic acid, oleic acid, elaidic acid, 9, 12-linoleic acid, 9, 11-linoleic acid (in cis, cis-trans and trans-trans forms), linolenic acid, elaeostearic acid, lignoceric acid, erucic acid, arachidonic acid, clupanodonic acid, α-parinic acid, α-licanic acid or their anhydrides, alone or in mixtures. It is preferable to use fatty acid mixtures that are obtained from natural vegetable and animal fats such as cottonseed oil, peanut oil, wood oil, corn oil, oiticica oil, olive oil, poppy-seed oil, boleko oil, olive kernel oil, perilla oil, rape oil, sunflower oil, walnut oil, grape seed oil, sardine oil, herring oil, menhaden oil, walrus oil, and especially linseed oil, soybean oil and safflower oil.

Use can also be made of industrial fatty acids, especially tall oil fatty acids, chemically treated fatty acids and fatty acids from chemically treated fats, especially dehydrated castor oil fatty acids or conjugated fatty acids which have been treated catalytically, fatty acids from catalytically conjugated fats, especially conjugated linseed oil-soybean oil-or safflower oil-fatty acids and fatty acids from elaidinized fats, partially hydrogenated fatty acids and fatty acids from partially hydrogenated fats, e.g. partially hydrogenated fish oils and mixtures of their acids and acid mixtures of the previously named kinds with one another, as well as fatty acid mixtures which include admixtures of rosin acids, especially colophony and/or partially hydrated rosin acids, especially partially hydrogenated colophony alone or in mixture.

Excellent results are obtained with industrial linoleic acids which are obtained by distillation and which are characterized by their high linoleic acid content (over 50 percent), low saturated fatty acid content (under 10 percent, and only a very low linolenic acid content (under 2 percent).

Under monobasic carboxylic acids are also meant partial esters of polybasic unsaturated carboxylic acids which have only one remaining free carboxyl group, especially partial esters of dimerized or polymerized unsaturated fatty acids and/or partial esters of their not accurately definable "tricarboxylic acids" which are produced by adduct formation of α,β-unsaturated fatty dicarboxylic acids or their anhydrides on unsaturated fatty acids, which are then esterified with preferably straight chain saturated aliphatic alcohols with 1 to 20 carbon atoms such as methanol, ethanol, propanol, and especially butanol, pentanol, hexanol and the like. The preferred alcohol for this purpose is methanol.

Suitable polybasic carboxylic acids B, to be used either alone or in mixtures, are di- or polycarboxylic acids e.g. oxalic acid, succinic acid, glutaric acid, adipic acid, pimelic acid, 2,2,4-trimethyl-adipic acid, suberic acid, azelaic acid, sebacic acid, maleic acid, fumaric acid, citraconic acid, mesaconic acid, itaconic acid, phthalic acid, isophthalic acid, terephthalic acid, tetrahydro- and hexahydrophthalic acid, trimellitic acid, and their anhydrides so far as they exist. Preferred dicarboxylic acids are those which are obtained by dimerization or polymerization of polybasic acids which contain unsaturated fatty acids.

Preferred polybasic carboxylic acids are the not accurately definable "tricarboxylic acids" that are adducts of α,β-unsaturated dicarboxylic acids or their anhydrides so far as they can exist, such as maleic acid, fumaric acid, mesaconic acid, citraconic acid, itaconic acid and their possible anhydrides among which maleic anhydride is the most important, upon unsaturated fatty acids such as palmitoleinic acid, petroselinic acid, oleic acid, elaidinic acid, cis-cis, cis-trans- and trans-trans-9,12-linoleic acid, cis-cis-, cis-trans- and trans-trans-9,11-linoleic acid, linolenic acid with isolated and conjugated double bonds, elaeostearic acid, eurocaic acid, arachidonic acid, clupanodonic acid, lincanic acid and parinaric acid, either alone or in mixtures. On unsaturated fatty acids, use is made especially of fatty acid mixtures as obtained from natural vegetable or animal unsaturated fats by saponification, such as fatty acids from cotton seed oil, lupine oil, corn oil, rape seed oil, sesame oil, grape seed oil, walnut oil, perilla oil, linseed oil, wood oil, oiticica oil, and especially soybean oil, poppy seed oil, sunflower oil and safflower oil. Also especially suitable are the unsaturated industrial fatty acids, especially tall oil. Of the chemically treated fatty acids or fatty acids from chemically treated oils, especially suitable are the fatty acids from dehydrated castor oil, while the conjugated and/or elaidinated fatty acids obtained by catalytic processes and/or fatty acids from catalytically conjugated and/or elaidinated fats, e.g. isomerized soybean oil-, safflower oil- and linseed oil fatty acids, although capable of being used, are not among the preferred fatty acids. Also suitable for use as unsaturated acids are resin acids such as colophony or partially hydrogenated resin acids, although generally only as up to admixtures up to 50 percent by weight to the above-named fatty acids. The added fatty acids can be used either singly or as mixtures.

The adduct formation is effected by heating in accordance with known methods of which the Diels-Alder reactions and the so-called "substituting addition" (H. Wagner-H.F. Sarx "Lackkunstharze " 1959 Karl Hanser publication, p. 87) represent the principal reactions. The molar ratio of α,β-unsaturated bicarboxylic acids to the unsaturated fatty acids can vary and also depends on the kind of fatty acid that is used, although the preferred adducts are those where the ratio is between 0.9:1 and 1.1:1.

The adduct formation can also be performed on oils such as triglycerides. Saponification is then done subsequently. It is also possible, during adduct formation, to isomerize the fatty acids catalytically.

By adding antioxidants the danger of polymerization during adduct formation can be lessened. Oils of relatively low viscosity are then obtained. By using additives such as triphenyl-phosphite which are known to have a favorable effect on the color, adducts of light color can be obtained, even with inferior grades of raw material.

Contrary to the prevailing opinion that for the production of water-soluble synthetic resins, adducts of α,β-ethylenically unsaturated dicarboxylic acids must be used on trans-trans isomerized fatty acids to avoid the formation of polymeric polybasic acids which would not be suitable for the production of water-soluble synthetic resins (see R. V. Crawford, P. A. Toseland "Fette. Seifen. Anstrichmittel," 66 1083 (1964), and "Farbe und Lack" 70 , 912 (1964)), it was unexpectedly discovered that it is exactly the adducts of such nonisomerized fatty acids which are the more suitable ones. Even with fatty acids from dehydrated castor oil, which are used in mixtures with other fatty acids for adduct formation, lower viscosities are obtained than with isomerized fatty acids.

TABLE

| | Admerginat ®A hydrolyzed | Adduct (hydrolyzed) | | | | |
|---|---|---|---|---|---|---|
| | | 1 | 2 | 3 | 4 | 5 |
| Gardner-Holdt, viscosity: 66.6% in butyl glycol | T+ | G-H | G+ | F | H | F+ — |

Adduct 1: 30 percent castor oil fatty acid, 45 percent distilled tall oil fatty acid with a resin content of about 1 percent, and 25 percent maleic acid anhydride, are converted into the adduct in a known manner by heating. After adduct formation there remained less than 1% of the original amount of maleic acid anhydride.

Adduct 2: 45 percent castor oil fatty acid, 30 percent distilled tall oil fatty acid with a resin content of less than 1 percent, and 25 percent maleic acid anhydride are converted into the adduct in a known manner by heating. After adduct formation there remained less than 1% of the original amount of maleic anhydride.

Adduct 3: 75 percent nonbreaked safflower oil and 25 percent maleic acid anhydride are converted into the adduct in a known manner by heating. After adduct formation there remained less than 1% of the original amount of maleic acid anhydride.

Adduct 4: 75 percent light colored linseed oil and 25 percent maleic acid anhydride are converted into the adduct in a known manner by heating. After adduct formation there remained less than 1% of the original amount of maleic acid anhydride.

Adduct 5: 75 percent distilled tall oil fatty acid with a resin content of less than 1 percent, and 25 percent maleic acid anhydride are converted into the adduct in a known manner by heating. After adduct formation there remained less than 1 percent of the original amount of maleic acid anhydride.

After their production the adducts were hydrolyzed with water at 100° C. for 2 hours. The reaction temperature in the adduct formation was 180° to 200° C.

By selecting and mixing suitable fatty acids the viscosity ranges of the adducts can be established, as can be seen from the present examples. Fatty acids which are readily polymerizable tend to produce highly viscous adducts while fatty acids of semidrying oils such as soybean or safflower oil produce adducts with low viscosity. Adducts with exceptionally high viscosity are obtained from isomerized and also from dimerized fatty acids so that these components in the preferred forms of this invention are to be considered only as additives. The viscosity can also be affected by the reaction time, the reaction temperature and the sequence of the reactions between the fatty acids and the α,β-ethylenically unsaturated dicarboxylic acids, and with E and L binders also by the degree of attachment of the α,β-ethylenically unsaturated dicarboxylic acids to the unsaturated fatty acids. In this case the proportion of nonattached dicarboxylic acids must not exceed 10 percent by weight of the added fatty acids. With E-binders the amount of free maleic acid anhydride after adduct formation must be less than 1 percent by weight of the total amount added. In agreement therewith is the determination that at the same viscosity the acid number during the esterification of the epoxy resin reaction products of epoxy resins and monobasic fatty acids can be lowered by a greater percentage with these adducts than by the use of hydrolyzed adducts of isomerized fatty acids and maleic acid anhydride, as for example of admerginat (R)$_4$. At the same time epoxy resin partial esters of the adducts of natural fatty acids show better water solubility. They also show a lighter color, while the adducts of natural fatty acids have lower iodine color numbers. By polybasic carboxylic acids are also meant partial esters of polycarboxylic acids, which however must be polybasic carboxylic acids. Special consideration is to be given to partial esters of polybasic carboxylic acids with saturated straight chain aliphatic monoalcohols with 1 to 20 carbon atoms. Especially suitable among these are the partial esters of the above described, but not accurately definable "tricarboxylic acids" which are obtained by adduct formation of $\alpha,\beta$-unsaturated dicarboxylic acids or their anhydrides on unsaturated fatty acids. Such partial esters can be obtained either:

a. by reaching $\alpha,\beta$-unsaturated dicarboxylic acids or their anhydrides with esters of the above-named unsaturated fatty acids with preferably saturated straight chain aliphatic monoalcohols having 1 to 20 carbon atoms such as methanol, ethanol, propanol, butanol, pentanol, hexanol or the like, especially methanol.

b. by partial esterification of the resulting adduct with preferably saturated, straight chain aliphatic monoalcohols with 1 to 20 carbon atoms such as methanol, ethanol, propanol, butanol, pentanol, hexanol and the like, especially methanol.

The polybasic carboxylic acids obtained by methods (a) and (b) are not identical. The water-dilutable synthetic resins produced therefrom show different behaviors, e.g., in relation to their storage stability. They also show different behaviors in the process of the present invention. The polybasic carboxylic acids obtained by process (b) generally require a somewhat higher esterification temperature and are preferred.

The production of partial esters of compounds containing epoxy groups or possibly hydroxyl groups, including those polyhydroxy compounds which are obtained by hydrolysis of compounds carrying epoxide groups, with monobasic carboxylic acids, is accomplished by heating and in cases where water is formed during the reaction, can be accelerated by the addition of azeotropic agents such as xylol to remove the water. It is preferable to remove the entraining material before the subsequent esterification with polybasic carboxylic acids. The esterification is preferably continued far enough to bring the acid number of partial ester close to zero. The esterification is facilitated by the addition of basic catalysts to accelerate the decomposition of the epoxy groups, as for example, anhydrous sodium carbonate. For the production of EC binding agents the use of such catalysts should, be avoided as much as possible so as not to needlessly increase the concentration of foreign ions.

During the esterification of polybasic carboxylic acids with epoxy resin partial esters, it should be noted that in the use of mixtures of polybasic carboxylic acids with carboxyl groups of different reactivities, the partial esterification is generally not uniform but occurs in successive stages, the slowly reacting carboxyl groups usually first undergoing partial esterification at higher temperatures while the rapidly reacting carboxyl groups undergo partial esterification subsequently at lower temperatures.

In order to keep good control over the reaction, the esterification should be performed at as low a temperature as possible. The temperature should generally not pass above 160°C.

The degree of esterification is preferably so chosen that the polybasic carboxylic acid is joined to the epoxy resin or to the polyhydroxy compound by close to one carboxyl group. A smaller amount of nonreacted polybasic carboxylic acids remaining possibly in the reaction product is of no significance.

The amounts of epoxy groups and possibly hydroxyl group carrying compounds and those polyhydroxyl compounds which were obtained by hydrolytic decomposition of epoxy group carrying compounds, relative to the amounts of polybasic carboxylic acids, can be varied within wide limits. It naturally depends on the kinds and sizes of the molecules of the polybasic carboxylic acids and of the epoxy groups and possibly hydroxyl group carrying compounds.

By the production of water-dilutable synthetic resins by partial esterification of epoxy resins on the basis of bisphenol-A and epichlorohydrin with aliphatic carboxylic acids and adducts of $\alpha,\beta$-unsaturated dicarboxylic acids on unsaturated fatty acids, very good resins are obtained when in the initial mixture the ratio of the number of hydroxyl groups (one epoxy group being counted as two hydroxyl groups while the phenolic hydroxyl groups are not counted at all), to the number of carboxyl groups (one anhydride group being counted as two carboxyl groups), is in the range from 1:0.8 to 1:2, the preferred range being from 1:1 to 1:1.4.

If a large excess of carboxyl groups is chosen, so that the epoxy resin is almost completely esterified, a subsequent partial esterification of the epoxy resin ester with mono- or polyvalent alcohols can be of advantage. Examples of suitable monovalent alcohols are methanol, ethanol, propanol, isopropanol, butanol, isobutanol, sec.-butanol, pentanol, hexanol and the like, while suitable polyvalent alcohols are ethylene glycol, 1,2- and 1,3-propylene glycol, 1,2-, 1,3-, 2,3- and 1,4-butylene glycol, neopentyl glycol, glycerol, trimethylol-propane, trimethylol-ethane, pentaerythrite, etc.

The great increase of viscosity during the esterification of high molecular epoxy resin partial esters with polybasic carboxylic acids can in some cases lead to difficulties in the preparation. It is possible to perform the esterification in the presence of solvents which do not take part in the esterification. Preferred solvents are those which are at least partially miscible with water, as for example glycol- or diglycol-diether, e.g. ethylene-glycol-diethyl-ether, diethylene-glycol-diethyl-ether, or also ketones as, e.g. methyl-isobutyl-ketone. These solvents generally do not need to be removed since they do not diminish the water-miscibility of the resin.

If solvents are used which are not miscible with water, then they must be removed prior to neutralization.

By the choice of carboxylic acids and relative amounts, it is possible to control the properties of the resin in relation to elasticity, hardness and protection of the deposited film against corrosion, but also for example, the separation amount in the electrophoretic lacquering process. In any event, the components of the reaction mixture, the epoxy compound and the mono- and polybasic carboxylic acids and the degree of esterification between the epoxy resin partial ester and the polybasic carboxylic acid must be proportioned in such a manner that after neutralization with aqueous ammonia solution or strong organic nitrogen bases, water-soluble or water-dispersible resins are obtained.

With epoxy resins that contain a large number of epoxide groups, the reaction can be performed in such a manner that the reaction products with polybasic acids are already soluble after neutralization, but the aqueous solution will gel after a while, which is generally undesirable. To acquire sufficient storage stability, the reaction must be continued until only few epoxide groups remain. The esterification can actually be continued until there are no longer any remaining epoxide groups.

This method of production by partial esterification of the epoxy compounds with monocarboxylic acids and subsequent reaction with polybasic carboxylic acids to produce acid epoxy resin esters has the important advantage of maintaining in the unsaturated fatty acids the double bonds which are so essential for film formation.

Film formation can also be accelerated by the addition of known catalysts, the so-called "siccatives."

The reaction with vinyl and/or vinylidene compounds occurs upon warming, preferably in the presence of polymerization catalysts. In the preferred form, 1,800 g. of the vinyl and/or vinylidine monomeric mixture to be reacted contain at least one acid equivalent (expressed in grams) which is introduced by at least one unsaturated carboxylic acid that is capable of copolymerizing with the vinyl and/or vinylidene compounds.

In relatively weak polar monomers such as styrene, $\alpha$-methyl-styrene and vinyl-toluene, 1,800 g. contain preferably 2 to 4 acid equivalents. In more strongly polar monomers such as acrylic and methacrilic acid esters of short chain aliphatic monoalcohols or diols, it is preferable to have 1 to 3 acid equivalents in 1,800 g. of total monomeric mixture.

The copolymerization reaction temperatures depend on the catalyzing system that is used. Temperatures between 120 and 160° C are preferred when di-tert.-butyl peroxide is used, possibly in combination with a chain breaker, preferably lauryl mercaptan. At lower temperatures, such as just above 120° C, the reaction mixture is often too viscous for easy working, and besides the reaction velocity which can be followed by the increase of solids content is very slow with some monomers. At higher temperatures, above about 180° C, products of lower viscosity are obtained, even by purely thermal polymerization. Fired layers of these have, however, a lower salt spray resistance.

The reaction speed can be increased by Co$^{++}$ salts, e.g. CoCl$_2$ in amounts of from 3 to 6 parts per million. The same reaction speeds are, however, also obtained by the use of V4A material.

By the presence of monomers with carboxyl groups, the water solubility of the reaction mixture is increased. Thus, even the water solubility of an epoxy resin ester that was modified with about 10 percent by weight of vinyl toluene and which is 1,800 g. of monomer mixture contained 2 acid equivalents introduced by acrylic acid and reacted in the presence of a catalyst mixture of di-tert.-butyl peroxide and lauryl mercaptan in the proportion of 1:0.5, was much better at 140°–150° C. than that of an epoxy resin ester at 200° C. which was reacted with only vinyl toluene and which had an even lower viscosity. By suitable selection of vinyl and vinylidene monomers, the film proporties of the binder can be controlled. Vinyl monomers D suitable for this purpose are the alkyl esters of $\alpha,\beta$-unsaturated monocarboxylic acids such as methyl acrylate, ethyl acrylate, propyl acrylate, butyl acrylate, octyl acrylate, 2-ethyl-hexyl acrylate, decyl acrylate, lauryl acrylate and the corresponding meth-, eth- and phenylacrylates, propyl crotonate, butyl crotonate and the like, also the hydroxyalkyl esters of $\alpha,\beta$-unsaturated carboxylic acids such as 2-hydroxyethyl acrylate, 2-hydroxypropyl acrylate, 2-hydroxybutyl acrylate, 3-hydroxybutyl acrylate, 6-hydroxyhexyl acrylate and the corresponding methacrylates, ethacrylates, phenyl-acrylate, 2-hydroxyethyl maleinate, di-(2-hydroxypropyl)-maleinate and also the fumarates, 2-hydroxy-3-chlorpropyl acrylate, 2-hydroxyl-1-phenyl-ethyl acrylate, 2-hydroxy-3-butoxy-propyl acrylate and the corresponding ethacrylates and phenyl acrylates, but also other polymerizable vinyl vinylidene compounds such as styrene, in the core substituted styrenes (o-, m-, p-methyl, ethyl, propyl and butyl-styrene, 2,4-, 2,3-, 2,5-dimethyl-styrene, 2,4-, 2,3-, 2,5-dichlor-styrene), and in the side chain substituted styrenes such as $\alpha$-methyl-styrene, $\alpha$-ethyl-styrene, $\alpha$-chlor-styrene, etc.

Of these monomers the following are preferably used: methacrylate, methyl methacrylate, ethyl acrylate, ethyl ethacrylate as well as 2-hydroxy-ethyl acrylate and 2-hydroxy-propyl acrylate. With the preferred monomers also belong styrene, $\alpha$-methyl-styrene and vinyl toluene by themselves or in mixtures. Suitable carboxyl group carrying monomers for copolymerization with the above-named monomers are acrylic acid, methacrylic acid, cinnamic acid, $\beta$-benzoylacrylic acid, crotonic acid, etc., also $\alpha,\beta$-ethylenically unsaturated polycarboxylic acids and their possible anhydrides such as maleic acid, fumaric acid, itaconic acid, citraconic acid, mesaconic acid, aconitic acid and monoesters of the named polycarboxylic acids with saturated straight chain mono- alcohols with 1 to 4 carbon atoms, preferably methanol, halogen-substituted acids such as chlor-maleic acid and the like.

To the preferred $\alpha,\beta$-ethylenically unsaturated monocarboxylic acids belong acrylic acid and methacrylic acid. The carboxyl group carrying monomers can be brought into reaction alone, in mixture with one another, alone in mixtures with the first-named monomer that do not carry carboxyl groups, or in mixtures with the latter.

The monomer mixture can have other polymerizable monomers, either alone or as mixtures, added thereto, such as acrylamide, methacrylamide, acrilnitrile, methacrylnitrile and the like.

Polymerization catalysts suitable for carrying out the copolymerization are: di-tert. butylperoxide, tert. butylhydroperoxide, cumolhydroperoxide, benzoylperoxide and methylethylketoneperoxide.

Specific examples of the copolymers of vinyl and vinylidene compounds with monocarboxylic acids are: the copolymerization products of the monocarboxylic acids A with the monomers D.

Examples of the copolymers of vinyl and vinylidene compounds with polycarboxylic acids are the copolymerization products of the polycarboxylic acids B with the monomers D, The specific examples of copolymers of binyl or binylidene compounds with epoxy resin partial esters are the copolymerization products of the partial esters of the epoxy resins C with monocarboxylic acids A, and with the monomers D.

Particularly preferred copolymers are the copolymerization products of 750 parts by weight of an epoxy resin partial ester I of an epoxy resin having an epoxy equivalent weight of about 250, a melting point of 20° to 28° C. and a molecular weight of about 470, esterified with an equal part by weight of a fatty acid distillate consisting of about 60 to 70 percent linolic acid, about 5 percent of saturated fatty acids and about 25 to 35 percent of oleic acid; with 75 parts vinyltoluene and 9 parts methacrylic or acrylic acid. Other preferred copolymers contain 750 parts of epoxy resin partial ester I, 19.5 parts styrene, 55.5 parts $\alpha$-methylstyrene and 9 parts methacrylic or acrylic acid; 750 parts epoxy resin partial ester I, 174 parts vinyltoluene and 16 parts methacrylic or acrylic acid; 750 parts epoxy resin partial ester I, 174 parts styrene and 16 parts methacrylic or acrylic acid; 750 parts epoxy resin partial ester I, 45 parts styrene, 131 parts $\alpha$-methylstyrene and 16 parts methacrylic or acrylic acid; and 750 parts epoxy resin partial ester I, 460 parts vinyltoluene and 41 parts methacrylic or acrylic acid; and 750 parts epoxy resin partial ester resin I, 120 parts styrene, 340 parts $\alpha$-methylstyrene and 41 parts methacrylic or acrylic acid.

Other particularly preferred copolymers are the copolymerization products of 750 parts by weight of an epoxy resin partial ester 2 of an epoxy resin having an epoxide equivalent weight of about 190, an index of refraction of 1.5720 at 20° C. and a molecular weight of 380, esterified with a fatty acid mixture consisting of 65–70 percent linolic acid, up to 5 percent of saturated fatty acids and up to 25–30 percent oleic acid where the resin/fatty acid mixture ratio is 700/945, with 75 parts vinyltoluene and 9 parts methacrylic or acrylic acid. Other preferred copolymers with epoxy resin partial ester 2 contain 750 parts of epoxy resin partial ester 2, 19.5 parts styrene, 55.5 parts $\alpha$-methylstyrene and 9 parts methacrylic or acrylic acid; 750 parts epoxy resin partial ester 2, 174 parts vinyltoluene and 16 parts methacrylic or acrylic acid; 750 parts epoxy resin partial ester 2, 174 parts styrene and 16 parts methacrylic or acrylic acid; 750 parts epoxy resin partial ester 2, 45 parts styrene, 131 parts $\alpha$-methylstyrene and 16 parts methacrylic or acrylic acid; 750 parts epoxy resin partial ester 2, 460 parts vinyltoluene and 41 parts methacrylic or acrylic acid; and 750 parts epoxy resin partial ester resin 2, 120 parts styrene, 340 parts $\alpha$-methylstyrene and 41 parts methacrylic or acrylic acid.

The vinyl content of plasticized synthetic resin depends on the intended use of the synthetic resin. EC binders can be modified with 2 to 25 percent by weight of vinyl and/or vinylidene compounds, preferably 5 to 15 percent by weight. With EC binders, care should be taken to continue the reaction to completion, namely to leave only a very small remainder of nonreacted monomers. If such a remainder is too large, there may be difficulties in the separation and in the compatibility with pigments. If the reaction is not complete, then the remaining monomers must be removed.

E-binders can be modified with 2 to 45 percent by weight of vinyl and/or vinylidene compounds, preferably with 15 to 35 percent.

Epoxy resin esters modified with 20 to 45 percent by weight of vinyl and/or vinylidene compounds are suitable selections for use as L-binders.

It is not only their relative amounts, but also the kinds of monomers that have a decisive effect. Suitable for use as EC-binders are styrene, $\alpha$-methyl-styrene and especially vinyltoluene. With these monomers binders can be produced which are distinguished by their excellent salt-spray resistance, great layer thickness obtainable with only slight field strength sensitivity, good penetration depth, high pigment reception capacity, good water solubility and relatively low viscosity of the concentrated aqueous solution.

Also for use as L-binders, but especially in mixtures with α-methyl-styrene, these monomers are preferred. For use as E-binders, excellent results are, however, also obtained with acrylic esters, especially if high gloss is required.

The epoxy resin esters and the vinyl and vinylidene monomers must be chosen with respect to type and quantity in such a manner that the non-pigmented films with EC- and E-binders produced from neutralized diluted solutions of the vinyl-modified epoxy resin esters will remain clear and homogenous after firing, or with L-binders after drying.

The sequence of reactions of the components such as the epoxy resin, the monocarboxylic acid, the polycarboxylic acid and the vinyl compounds which are necessary for the formation of the vinyl-modified epoxy resin ester can be varied. It must, however, be kept in mind that a change of sequence may result in the production of dissimilar products.

Short symbols for the usable components are:
A- Unsaturated monocarboxylic acids;
B- Polycarboxylic acids or anhydrides;
$B_1$-Adducts of α,β-ethylenically unsaturated dicarboxylic acids or anhydrides on A where A is practically hydroxyl group free;
$B_{1h}$- Hydrolyzed $B_1$ hence free from anhydride groups;
C- Epoxy resins;
D- Vinyl or vinylidene compounds, preferably in amounts of at least one gram-acid equivalent in 1,800 grams of monomer mixture.

The sequence of reactions that is chosen for the components for the production of the vinyl modified epoxy resin ester satisfies the following requirements:

1. The reaction with D occurs in a single stage where compounds with ethylenically unsaturated double bonds are present which were introduced by at least one of the components A, $B_1$ and $B_{1h}$, preferably by compound A.
2. The fatty acid content that was introduced into the vinyl modified epoxy resin ester by component A amounts to at least 10 percent by weight.
3. The polyhydroxyl compounds C which carry epoxy groups preferably do not react with anhydrides but only with free carboxylic acids.
4. The reaction course for reacting the partial ester with polycarboxylic acids or their anhydrides is chosen in such a manner that the polycarboxylic acids are bound by esterification with only one carboxyl group.
5. The polycarboxylic acid or anhydride content is high enough so that after neutralization with ammonia or amines, synthetic resins that are sufficiently water-dilutable are produced.
6. In the preferred form, after copolymerization with D there are not any conditions established under which there occurs esterification of the carboxyl groups of the carboxylic acids that are to be copolymerized.
7. For the production of L-binders, the proportion of fatty acids in the drying and semi-drying oils of plasticized synthetic resins remains high, preferably above 45 percent by weight.

The preferred methods of practicing this invention will now be described. The components included in parentheses are used only occasionally. The components must generally be reacted successively, it being only rarely that several components can be reacted at the same time.

Where some of the components must first be reacted separately and then with the remaining components, the former components are included in brackets.

Good results are obtained by the following methods;
C + A + D + B
C + A + D + $B_{1h}$ + (B)
C + A + B + D
C + A + $B_{1h}$ + (B) + D
C + A + [$B_{1h}$ + D ]
The best scheme is C + A + D + $B_{1h}$.

To produce binders with the desired properties, consideration should be given to the ratio of carboxyl to hydroxyl groups, the acid number, and for EC-binders especially the viscosity of the plasticized synthetic resin.

The reaction of the components should lead to the lowest possible acid numbers for the plasticized synthetic resin because the film properties become better with lower acid numbers. Since, however, the water solubility of the resin also depends on the acid number, a compromise must be arrived at experimentally. In most cases, it is best to keep the acid number between 50 and 120 and to provide for adequate water solubility by including a sufficient number of hydrophylic groups in the resin molecules. For EC-binders it has been found advantageous to keep the acid number below 80.

The acid number is determined by titration of the resin solution in xylene/butanol with n/10 KOH in isopropanol, using phenolphthalein as an indicator. If the resin contains any anhydrides, then it should first be hydrolyzed by heating 2 hours at 100° C. with twice the theoretical amount of water.

In the preferred form of this invention, the ratio of the hydroxyl numbers to the acid numbers should be in the range of 0.2:1 to 2:1, preferably between 0.3:1 and 1.3:1.

Unlike the acid number, the hydroxyl number is not determined experimentally but is calculated from the experimentally determined acid number. Phenolic hydroxyl groups are not counted, whereas the epoxy group is counted as two hydroxyl groups.

Etherification reactions which may have occurred are disregarded, but not esterification reactions.

It has been found to be important, especially when these synthetic resins are to be used for the production of electrophoretically separable coating materials, to keep the viscosity of the vinyl modified epoxy resin ester within certain viscosity limits if the binders are to be of general utility. It has been found that if the material is to be used for electric insulation purposes, the molecular weight and the molecular weight distribution of the vinyl modified epoxy resin ester are of importance. With increasing molecular weight, namely with increasing viscosity, the electric resistance of the film increases. It has, therefore, been found to be important, not only to keep the average molecular weight within certain limits, but also to keep the range of molecular weight distribution as narrow as possible. It is, therefore, not advisable for the production of vinyl modified epoxy resin esters to use starting substances of high molecular weight, or to let the molecular weight become too high during any stage of the reaction.

Excellent results are obtained if the viscosity of the plasticized synthetic resin, measured in 50 percent butyl glycol, is in the range from B to Q (Gardner-Holdt viscosimeter). The best resins have viscosities in the range of from C to H.

In the preferred form of this invention, the viscosity should not in any stage of the process be greater than the viscosity of the final product.

For E- and L-binders, the viscosity range is not so critical because the working viscosity can be regulated by the use of solvents. Obviously the resins must always remain soluble in suitable solvents.

For neutralization of the epoxy resin esters by themselves or in mixtures, aqueous ammonia solution or strong organic nitrogen bases such as triethylamine, diethylamine, trimethylamine, piperidine, morpholine and monoethylamine are suitable. Tertiary, secondary and primary alkylolamines, as for example triethanolamine, diethanolamine, monoethanolamine, N-dimethanolamine, N-methylethanolamine, N-diethanolamine, mono-isopropanolamine, di-isopropanolamine, tri-isopropanolamine and polyglycolamine and especially diglycolamine are also very suitable. Use can also be made of butanolamine, hexanolamine, methyl-diethanolamine, octanolamine and polyamines such as ethylene-diamine, diethylenetriamine and triethylene-tetramine, but these only in mixtures with monoamines.

By strong organic nitrogen bases are meant those which in 0.05 normal aqueous solution have a pH of at least 10.0 at 25° C.

Amines suitable for EC-binders are especially triethylamine diethylamine, N-dimethyl-ethanolamine and di-isopropanolamine.

For E-binders, preference is given to aqueous ammonia solution, diethylamine, triethylamine and N-dimethyl-ethanolamine.

For L-binders, preference is given to aqueous ammonia solution, although the use of the other amines mentioned above is possible if the yellowing tendency is not objectionable.

It is not always necessary to add nitrogen bases in amounts that are theoretically necessary for neutralization, as lesser amounts are often sufficient to obtain the required water solubility.

Colloidal solutions are preferably produced which can be either clear or turbid.

The components can be combined in any desired sequence. It is preferable to combine them with the neutralizing agent in the presence of water. The temperature during neutralization should be such that the desired water solubility can be reached without, however, causing much saponification of the synthetic resin, and should preferably be kept between 20° and 50° C. Amide formation should also be largely avoided.

The organic solvents which are sometimes added must be so chosen as to be compatible with the other components. The total amount of added solvents should be as small as possible, especially with EC-binders for electrophoretic use, because of their effect on the formation and electric resistance of films. As a solvent for EC-binders, isopropylglycol is suitable.

For use of the material as an L-binder, an addition of dry substances which accelerate the drying of the film is very advantageous. Siccatives containing Co, Mn, Pb etc. are suitable. An addition of siccatives is also advantageous for E-binders.

For E- and EC-binders, an addition of phosphoric acid salts and esters to accelerate the hardening can be advantageous. With EC-binders such an addition must, however, be carefully controlled because in some cases film formation will be disturbed thereby. The amount of such an addition should not exceed 3 percent by weight of the total solid content.

The synthetic resins produced according to this invention can be used either with or without pigments and/or fillers. They can be coated upon ferrous or non-ferrous metals, with or without preliminary treatment such as passivating, phosphatizing, electrochemical treatment, galvanizing, tin coating or other metallizing treatment.

For L-binders, wood and wood products can also be used as base materials.

Without limiting the invention thereto, the following pigments and/or fillers are suitable for use with this invention: red iron oxide, blacksoot, lead silicochromate, strontium chromate, barium sulfate, powdered barite, powdered talcum, colloidal chalk, diatomaceous earth, china clay, titanium dioxide, chromoxide green and others. For the use of suitable titanium oxides, see the article by F. Holzinger in "Deutsche Farbenzitschrift" Vol. 19, page 401 (1965). For the selection of color pigments, see the article of G. H. Ott and B. Dreher, in "Schweizer Archiv. für angewandte Wissenshaft und Technik," Vol 31, Book 6, page 189 (1965).

Not suitable are the strongly basic pigments such as zinc oxide, zinc chromate, lead carbonate, basic barium sulfate, minimum and calcium plumbate. These pigments have a tendency to thicken and even to precipitate.

The ratio of pigment to binder depends on the type of pigment and of coating material that is used. For use with an electrophoretic coating material, a ratio of pigment to binder between 0.1:1 and 0.8:1 is used. For the usual coating methods such as spraying, immersion, flooding, brushing or the like, a ratio from 0.6:1 to 2:1 is generally used.

The invention is also applicable to the use of these water-dilutable synthetic resins as electrophoretically separable binders.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

DESCRIPTION OF THE PREFERRED EMBODIMENTS

Production of epoxy resin partial ester 1
(Unless otherwise stated, T always means parts by weight. The viscosity is determined by the Gardner-Holdt method).

800 T epoxy resin with an epoxy equivalent weight of about 250, a melting point of 20° to 28° C. and a molecular weight of about 470, which was obtained in a known manner by condensation of 2,2-bis(4-hydroxyphenyl)-propane and epichlorohydrin in the presence of strong alkalies, are esterified with 800 T of a fatty acid distillate consisting of about 60 to 70 percent of linoleic acid, about 5 percent of saturated fatty acids and about 25 to 35 percent of oleic acid at 220° to 230° C. under an inert gas until the acid number falls to below 1. The viscosity, measured at 66 percent in butyl glycol, is in the range of from F to K.

Production of fatty acid adduct A

300 T dehydrated castor oil fatty acids, 450 T tall oil fatty acids with a resin content of not over 1.5 percent and a content of unsaponifiable matter of less than 1 percent, are reacted in a known manner at 180°–200° C. with 250 T maleic acid anhydride until there remains less than 1 percent of the initial amount of anhydride. After completion of the adduct formation the mixture is cooled to 80° C. and the anhydride hydrolyzed by keeping it two hours at 100° C. in the presence of water.

EXAMPLE 1.

750 T epoxy resin partial ester 1, 75 T vinyltoluene, 9 T acrylic acid, 3 T di-tert.-butyl peroxide and 1.5 T lauryl mercaptan are reacted at 150° C. in a stainless steel vessel that is equipped with a cooler, a stirrer and a thermometer until the solids content has increased to about 98 to 99 percent. The copolymerization can sometimes be accelerated by the addition of small amounts of catalyst. After reaching the final solids content, the remaining volatile components are distilled under vacuum. The viscosity of the resin, measured at 66 percent in butyl glycol, drops to between M and Q. After this distillation, 360 T of the fatty acid adduct A are added and the mixture is reacted at 140°–160° C. until the viscosity of the resin with 50 percent in butyl glycol reaches the F to H range. The reaction is preferably performed under vacuum and the superfluous water distilled off. The resin is neutralized with water and di-isopropanolamine until a sample of 20 percent of the resin in water has a pH of 8. The resin is brought to a solids content of 75 percent.

Evidence of New and Unexpected Results

Comparison resin I (produced according to an earlier unpublished suggestion)

800 T epoxy resin partial ester 1 and 390 T fatty acid adduct A are brought to reaction at 140°–160° C. in a stainless steel kettle equipped with cooler, stirrer and thermometer until the viscosity of the resin, measured with 50 percent in butyl glycol, arrives in the range between F and H. The resin is neutralized with di-isopropanolamine in water until the pH value of a sample in 20 percent aqueous solution reaches 8. The resin is adjusted with water to a solid content of 75 percent.

The comparison resin I and the resin of Example 1 of this invention are each diluted with deionized water to a solids content of 40 percent and in a ceramic ball mill are comminuted with a pigment mixture of red iron oxide (Bayer 510F) and basic lead silicochromate (Oncor M 50) in the ratio of 9:1, and with a pigment-to-binder ratio of 0.6:1. The resulting pastes are diluted with water to a solids content of 16 percent. The resin solutions are each filled into a steel beaker measuring 10×10×18 cm high and passivated sheets of metal measuring 8.5×11.5×0.1 cm (Bonder 1020/5 Metallgesellschaft) placed therein and connected as anodes to a D.C. source of constant voltage of 100-120 volts about 2 minutes to be coated, until the film has acquired a thickness of about 45 $\mu$. With the resin of Example 1 the film thickness of 45 $\mu$ was produced in 2 minutes by a potential of 120 volts whereas with comparison resin I the film thickness of 45 $\mu$ was produced in 2 minutes by a potential of 100 volts. The baking temperature of the films was 170° C. and the baking time 30 minutes.

|  | Pendulum hardness seconds | Film surface Gloass 45° C.) | Rust formation at edges after 240 hrs ASTM-B 117-61 |
| --- | --- | --- | --- |
| Lacquer of comparison resin I | 35 | Slightly wrinkled 58 | Considerable |
| Lacquer of the resin of Example 1 | 81 | Smooth 87 | Slight |

Epoxy resin partial ester 2

700 T of an epoxy resin with an epoxide equivalent weight of about 190, an index of refraction of 1.5720 at 20° C. and a molecular weight of about 380, and which was obtained in a known manner by condensation of bisphenol-A with epichlorohydrin in the presence of alkalies, are esterified at 220°-230° C. under inert gas with 945 T of a fatty acid mixture (consisting of 65-70 percent linoleic acid, up to 5 percent of saturated fatty acids and up to 25-30 percent of oleic acid) in the presence of 0.5 T anhydrous soda until the acid number falls to below 1. The viscosity, with 66 percent in butyl glycol is in the range from B to D (Gardner-Holdt viscosimeter).

EXAMPLE 2

1,000 T of epoxy resin partial ester 2 are reacted 2 to 3 hours in a flask equipped with a stirroer, a cooler and a thermometer, with a mixture of 210 T styrene, 570 T α-methylstyrene, 70 T acrylic acid and 28 T di-tert.-butyl peroxide, the reaction temperature being maintained at about 150° C.

The mixture is kept at this temperature until the solids content reaches about 83 percent. The excess of monomers is distilled off under vacuum. The acid number amounts to 25 to 35 and the viscosity of 66 percent in butyl glycol is in the range from S to Z. After the distillation has ended, the vacuum is interrupted by inert gas and after an addition of 410 T of fatty acid adduct A, the resin is reacted at 140°-150° C. until the viscosity of 50 percent in butyl glycol iS in the range from E to G. The resin is diluted with ethyl glycol to a solids content of about 80 percent and is neutralized at a temperature below 40° C. with aqueous ammonia until the resin is infinitely dilutable with water. By pigmentation with suitable pigments, e.g. titanium dioxide, and addition of water-dispersible driers, for which the co-containing driers are well suited, and dilution with water and possibly with a further addition of solvents a lacquer is produced which has excellent air drying properties.

Epoxy resin partial ester 3

A mixture of 160 g vinyltoluene, 18.5 g acrylic acid, 6.4 g di-tert.-butyl peroxide and 3.2 g lauryl mercaptan is added at 130° C. in 30 minutes to 400 g of a fatty acid distillate, which consists of 60 to 70 percent of linolic acid, 25 percent of saturated fatty acids and 25 to 35 percent of oleic acid. The temperature is then raised to 150° C. and this temperature is maintained until the solids content has increased to 99 percent. The remaining volatile components are then distilled off under vacuum. 400 g of an epoxy resin with an epoxy equivalent weight of about 250, a melting point of 20° to 28° C. and a molecular weight of about 470, which was obtained in a known manner by condensation of bisphenol A and epichlorhydrin in the presence of strong alkalies, are then added. The mixture is heated to 250° C. until the acid number has dropped to under 3. The viscosity of the product, measured 1:1 in butyl glycol at 20° C. according to Gardner-Holdt, is I.

EXAMPLE 3

980 g of the epoxy resin partial ester 3 are reacted with 330 g fatty scid adduct A at 140° to 150° C. until the viscosity, measured 50 percent in butyl glycol, is about Q (Gardner-Holdt). The resin is then diluted with ethyl glycol to a solids content of 80 percent and is neutralized below 40° C. with aqueous ammonia solution.

The resin is infinitely dilutable with water and is suitable for electrophoretical deposition.

EXAMPLE 4

330 g of fatty acid adduct A are mixed with a mixture out of 50 g styrene, 8 g acrylic acid, 2 g di-tert.-butyl peroxide and 1 g lauryl mercaptan at 130° C. The temperature is then raised to 150° C. and maintained until the solids content has reached 98 to 99 percent. The remaining volatile components are then removed by vacuum distillation. The product has a viscosity of A-B measured 50 percent in butyl glycol at 20° C. according to Gardner-Holdt. 800 g epoxy resin partial ester 1 are then added and the mixture is reacted at 150° C. until the viscosity, measured 50 percent in butyl glycol at 20° C., is about H-I according to Gardner-Holdt. The product is then diluted with ethyl glycol to a solids content of 80 percent.

EXAMPLE 5

400 g of the epoxy resin partial ester 1 are heated to 150° C. During a period of 3 hours a mixture of 91 g styrene and 9 g acrylic acid and 3 g di-tert.-butyl peroxide are added. The reaction is held at 150° C. until the solids content has reached 98 percent and then the unreacted monomers are removed by vacuum distillation. The viscosity of the product is Q measured 2:1 in butyl glycol at 20° C. according to Gardner-Holdt. 96 g trimellitic acid anhydride are then added at 170° C. and this temperature is maintained until the viscosity is L-M measured 1:1 in butyl glycol at 20° C. according to Gardner-Holdt. The resin is neutralized with triethylamine and diluted with water to a solids content of 60 percent.

EXAMPLE 6

The procedure is as in Example 5. However, instead of trimellitic acid anhydride 76 g of tetrahydrophthalic acid anhydride are added at 130° C. This temperature is held until the viscosity measured 1:1 in butyl glycol is Q according to Gardner-Holdt. The resin is neutralized with diisopropanolamine and diluted with water to a solids content of 80 percent.

EXAMPLE 7

375 parts epoxy resin partial ester 1 and 360 parts fatty acid adduct A are mixed. The mixture is heated to 150° C. and this reaction temperature is held until the acid number has reached about 120° C. After cooling off to 80° C., 75 parts vinyltoluene, 9 parts acrylic acid and 1.5 parts lauryl mercaptan are added. At a temperature of 100° C. 4 g cumolhydroperoxide dissolved in 10 g isopropyl glycol are added. The temperature is held at 80° to 90° C. until the solids content has reached about 96 percent. The unreacted monomers are removed by careful application of vacuum. The resin is diluted with butyl glycol to a solids content of 80 percent and neutralized with diisopropanolamine. It is infinitely water-dilutable.

EXAMPLE 8

800 parts epoxy resin partial ester 1 are filled into a stainless steel reaction vessel which is equipped with cooler, stirrer and thermometer. In 2 hours 60 parts styrene and 3 parts di-tert.-butyl peroxide are dropped into the mixture at 150° C. The reaction is maintained at a temperature of 150° C. until the solids content has risen to 98 – 99 percent. Unreacted volatile components are removed by the application of vacuum. 400 parts fatty acid adduct A are then added and the mixture is reacted at 150° C. until the viscosity measured 50 percent in butyl glycol has reached Q according to Gardner-Holdt. The resin is diluted with ethyl glycol to a solids content of 80 percent. The resin is infinitely water-dilutable after neutralization with diisopropanolamine.

The preceding examples can be repeated with similar success by substituting the generically and specifically described reactants and operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

I claim:

1. In a process for producing water dilutable epoxy resin ester coating compositions comprising:
   a. forming partial esters of compounds containing epoxy groups or hydroxyl groups formed by hydrolytic dissociation of said epoxy groups with monocarboxylic acid mixtures which consist of at least up to 60 percent by weight, of aliphatic unsaturated straight chain fatty acids having 10 to 40 carbon atoms, said compounds containing epoxy groups consisting of epoxy resins of the general formula

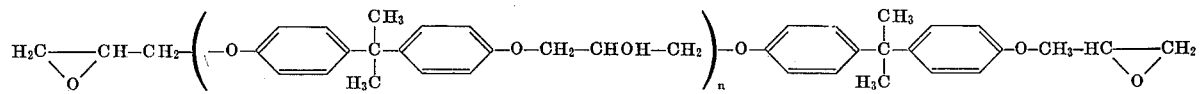

wherein $n$ represents molecular weights of between about 380 and 3,500;
   b. reacting said partial esters with hydrolyzed adducts of $\alpha,\beta$-unsaturated dicarboxylic acid compounds selected from the group consisting of oxalic acid, succinic acid, glutaric acid, adipic acid, pimilic acid, 2,2,4-tri-methyl-adipic acid, suberic acid, azelaic acid, sebacic acid, maleic acid, fumaric acid, citraconic acid, meraconic acid, itaconic acid, phthalic acid, isophthalic acid, terephthalic acid, tetrahydrophthalic acid, hexahydrophthalic acid, trimellitic acid and maleic anhydride with aliphatic unsaturated straight chain fatty acids having 10 to 40 carbon atoms whereby the resulting epoxy ester resins have free carboxyl groups and free hydroxyl groups rendered water-dilutable by neutralization with aqueous ammonia or strong organic nitrogen bases in the presence of water; and
   c. reacting the material produced in step (b) with sufficient basic material selected from the group consisting of aqueous ammonia and strong organic nitrogen bases in the presence of water until the esters are converted into water-dilutable synthetic resins, the improvement comprising;
   copolymerizing by heating in the presence of polymerization catalysts a compound selected from the group consisting of $\alpha,\beta$-vinyl and $\alpha,\beta$-vinylidene compounds with the compounds selected from the group consisting of said partial esters of step (a), the reaction products of step (b), said aliphatic unsaturated straight chain fatty acids used in step (a) and said aliphatic unsaturated straight chain fatty acids used in step (b);
   wherein the products of said copolymerizing are vinyl modified epoxy resin esters having free carboxyl groups, free hydroxyl groups and acid numbers between about 35 and 300, and the ratio of the number of free hydroxyl groups to the number of free carboxyl groups is between about 0.2:1 and 2:1.

* * * * *